United States Patent
Vilanova et al.

(10) Patent No.: US 7,134,737 B2
(45) Date of Patent: Nov. 14, 2006

(54) CLOSED-LOOP COLOR CORRECTION USING FACTORY-MEASURED COLOR CUTOFFS ANCHORED TO FIELD-MEASURED WHITE POINT

(75) Inventors: Ferran Vilanova, Barcelona (ES); Miquel Boleda, Barcelona (ES); James L. McCullough, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1155 days.

(21) Appl. No.: 09/945,492

(22) Filed: Aug. 31, 2001

(65) Prior Publication Data

US 2005/0073545 A1 Apr. 7, 2005

(51) Int. Cl.
*B41J 29/393* (2006.01)

(52) U.S. Cl. .......................................... 347/19; 358/504

(58) Field of Classification Search .................. 347/19, 347/15, 14, 16; 358/1.9, 3.27, 504
See application file for complete search history.

(56) References Cited

U.S. PATENT DOCUMENTS 5,539,434 A * 7/1996 Fuse ........................... 347/19
5,835,108 A * 11/1998 Beauchamp et al. .......... 347/19

\* cited by examiner

*Primary Examiner*—Lamson Nguyen
(74) *Attorney, Agent, or Firm*—Peter I. Lippman

(57) ABSTRACT

Absolute perceptual values are stored in the design lab, for maximum-density-tone cutoffs—preferably a maximum yellow-blue chrominance b* for yellow and minimum luminosity L* for other colorants. Automatic field operations in each printer then force the printer to subsequently print nominal full-saturation colorants so as to match the stored values. In addition to the stored cut-offs, black-and-white reference values measured in the printer are also used in linearizing printer response, for specific combinations of printing medium and printmode.

38 Claims, 6 Drawing Sheets

FIG. 14

| printing medium | mode (passes) | K | C | M | L* Y | c | m | b* y |
|---|---|---|---|---|---|---|---|---|
| coated | 4, 8 or 12 | 0.224 | 0.538 | 0.483 | 1.064 | 0.770 | 0.652 |
| glossy | | 0.101 | 0.562 | 0.508 | 1.157 | 0.759 | 0.719 |
| heavyweight coated | | 0.233 | 0.561 | 0.465 | 1.064 | 0.762 | 0.664 |
| semigloss #1 | | 0.145 | 0.563 | 0.472 | 1.124 | 0.763 | 0.679 |
| semigloss #2 | | 0.063 | 0.535 | 0.481 | 1.124 | 0.753 | 0.691 |
| photo | 4 or 8 | 0.055 | 0.552 | 0.484 | 1.126 | 0.749 | 0.710 |
| | 12 | 0.002 | 0.433 | 0.401 | 1.116 | 0.667 | 0.609 |

CLOSED-LOOP COLOR CORRECTION USING FACTORY-MEASURED COLOR CUTOFFS ANCHORED TO FIELD-MEASURED WHITE POINT

RELATED PATENT DOCUMENTS

Closely related documents are other, coowned U.S. utility-patent documents—hereby wholly incorporated by reference into this document. One such document is in the names of Francesc Subirada et al., application Ser. No. 09/919,207 entitled "LINEARIZATION OF AN INCREMENTAL PRINTER BY MEASUREMENTS REFERRED TO A MEDIA-INDEPENDENT SENSOR CALIBRATION"—later issued as U.S. Pat. No. 7,027,185. Another such document is also of Subirada et al., U.S. application Ser. No. 09/034,722, "SCANNING AN INKJET TEST PATTERN FOR DIFFERENT CALIBRATION ADJUSTMENTS", issued as U.S. Pat. No. 6,196,652; another of Thomas H. Baker et al., Ser. No. 09/183,819 entitled "COLOR-CALIBRATION SENSOR SYSTEM FOR INCREMENTAL PRINTING" issued as U.S. Pat. No. 6,832,824; yet another Ramón Borrell, Ser. No. 09/252,163 entitled "PIXEL-DENSITY AUGMENTATION AND ADJUSTMENT WITH MINIMUM DATA, IN AN INCREMENTAL PRINTER" issued as U.S. Pat. No. 6,690,485; still another of Soler et al., Ser. No. 09/919,260 entitled "COMPENSATING FOR DRIFT AND SENSOR PROXIMITY IN A SCANNING SENSOR, IN COLOR CALIBRATING INCREMENTAL PRINTERS", later issued as U.S. Pat. No. 7,023,581; and other of Francis Bockman and Guo Li, entitled "CONSTRUCTING DEVICE-STATE TABLES FOR INKJET PRINTING", U.S. application Ser. No. 08/960,766, issued as U.S. Pat. No. 6,178,008.

FIELD OF THE INVENTION

This invention relates generally to machines and procedures for incremental printing of text or graphics on printing media such as paper, transparency stock, or other glossy media; and more particularly for such methods and apparatus that construct text or images from individual ink spots created on a printing medium, in a pixel array. Although for definiteness and simplicity much of this document is couched in terms of a scanning thermal-inkjet machine and method, the invention is equally applicable to the several other forms of incremental printing that are subject to variation of marking density as among printheads. The invention uses lab-collected high-tonal-density data as a standard to avoid uncontrolled color variations among printers within a product line.

BACKGROUND OF THE INVENTION

Some amount of color variation is inherent in all printing processes. Inkjet printing is no exception.

Many sources of color variation have been characterized. The two most important of these appear to be dot-size variations and hue variations.

The first of these, variation in dot size, is largely due to drop-weight variation or dot-gain variation. The second, hue variation, is sometimes due in turn to dot-size variation—but perhaps more sensitively to environmental ink-to-media interactions.

(a) Graphic-arts requirements—Consistency of color reproduction is important in all printing processes, but particularly so in production or commercial work. Accordingly for incremental printers that are designed especially for commercial use, it is especially important to control reproduction of color via closed-loop measurement and correction.

Color consistency or reproducibility, i.e. precision, is a different matter from color accuracy—although as usual accuracy is in principle attainable only to the extent that there is precision. Accuracy is related to precision as a mean value or time average 11 (FIG. 1) of a varying parameter 12 is related to the extent 13 of variation.

For a modern-day printing product, particularly in the multitasking environment, color performance immediately after calibration is limited by the I. C. C. profile capability. (The initials "I. C. C." stand for the "InterColor Consortium", which has developed the industry-standard "profile" or color-mapping protocol for converting input image file data, e.g. a TIFF file, into device CMYK values, with correction for color differences.)

For the statistical 95% confidence level throughout the printer gamut and product line, a mean-accuracy goal (FIG. 2) is dE=4. (The notation "dE" is a shorthand for dE*ab, which is the root-mean-square Euclidean distance between two colors in the L*a*b* color space.) Correspondingly a total color error ("TCE") goal is dE=9.

Such performance requires that the degree of consistency in color accuracy possess a robustness to all the possible sources of color variation from the nominal. This includes changes in environment, printheads, media lots and so forth. Some of these changes typically introduce color variations so large as to swamp out all calibration efforts, and therefore simply constitute a requirement for recalibration.

Furthermore, once again, such achievement is assumed to be available only within a limited time after calibration. Hence a user who relies upon a printer for a livelihood—e.g. a graphic-arts professional—should be warned to perform the calibration on a regular basis, to keep the machine within the goals indicated. In view of these considerations, assuming full-time use, color calibrations are required weekly and also at each change of printhead or media.

(b) Related work in the art—Recent efforts by others have attacked problems of reliable field linearization in an incremental printer using a so-called "line sensor"—already present in the printer for use in interhead alignment and the like—in color-tone pseudodensitometry. Though the linearization is a field operation, a groundwork for these procedures begins with calibration of the sensor itself, preferably treated as media-independent calibration and performed at the factory.

(In some variants, a sensor calibration can be obtained with no field measurements at all—and therefore can be performed in the field, using tabulations of those colorant properties, or can simply be loaded into the printer as a complete calibration data set. Such calibration is based upon known spectral properties of the colorants that are loaded into the printer. Either the colorant properties or the calibration data as such can be, for instance, downloaded from the printer manufacturer via the WorldWide Web.)

Thereafter, with a line sensor precalibrated, linearization proceeds in the field by automatic printing of a tonal ramp, and using that sensor to measure the printed ramp. The linearization also includes—first for black-and-white colorant measurements—normalizing the sensor readings with respect to the tonal range between reflection from unprinted printing medium and the nominal maximum black tone.

Measurements of reflection from the unprinted medium are adequately precise and accurate, particularly in view of the advantageously high light level and therefore good signal-to-noise ratio for such measurements. Somewhat the contrary is the case of determinations at the other end of the printer dynamic range, where the light level in a black tone is by definition extremely low.

As a practical matter, fortunately, this black tone may in fact be treated as zero signal in the sensor. Alternative assumptions about its level may be made instead, to cope with the very great difficulty of accurately measuring, with pseudodensitometric equipment, the very low light levels involved. (For example the system may sense a dark region provided in the printer for the purpose.) In any event the normalized sensor gray-scale pseudodensitometric readings are called "absolute contrast ratios", abbreviated "ACR".

As to chromatic-colorant measurements, however, maximum-saturated chromatic tones cannot be considered equal to zero in light level and cannot otherwise readily be fixed to any alternative true standard. Therefore the conventional field linearization has simply proceeded on the assumption that those maximum chromatic-colorant tones are correct—and accordingly that each such tone should and must merely be accepted, as-is, to form one established endpoint of the tonal range to be linearized.

In effect the operation of each printhead was itself accepted as defining a color standard. Unfortunately, in the incremental-printing field printheads and inks are subject to significant tolerances in several parameters, leading to corresponding variations in inking density as among inks, printheads and therefore printers in a product line.

Nevertheless conventionally these chromatic-colorant measurements are followed by normalization with respect to the tonal range between reflection from unprinted print medium and the actually measured nominal maximum chromatic-colorant tone. These normalized values are called "local contrast ratios", abbreviated "LCR".

In some such linearization procedures, the normalized chromatic tones (which as noted above are inaccurate due to product tolerances and absence of a pertinent color standard) may further be referred to the black-and-white normalized values, which in turn are somewhat unreliable because of the above-mentioned assumptions in dealing with the black level.

Based upon nonlinearity in the normalized, adjusted and referred readings, these earlier procedures continue with determination of a correction function needed to establish linearity in the readings. They then store the correction function for use as a calibration of the printer in subsequent printing.

Such methods are adequate to correct for life effects and other variabilities that may occur among different sensors, in the absence of an on-line characterization for each individual sensor. For linearization purposes alone, they are sufficient.

Due to the limitations noted above, although the pseudodensitometric sensor systems can respond to relative tonal differences they are not capable of reliable absolute tonal readings. Accordingly these earlier systems yield reasonably well linearized hardcopy printouts but not absolute consistency—particularly not reliable consistency as among different printers, different printheads or different ink sets.

Methods described in the foregoing discussion have been introduced for printers in certain specialized markets. These include, in particular, machines for printing high-quality images of photograph-like subject matter.

Such devices are generally outfitted with correspondingly specialized printheads—e.g., in some cases, heads selected for extremely high uniformity of inkdrop weight. In some cases the printheads may be in matched sets of different colorants to be used together.

Those specialized printers are used only for art-quality reproductions, fine posters and the like. Therefore the additional cost of selected and even matched heads is readily justifiable.

Another approach that may be justified for specialized, high-end machines is provision of a fully qualified onboard colorimeter—as suggested, for example, by the previously mentioned patent document of Baker. It will be understood, however, that neither the expense of matched heads nor that of built-in colorimetry is normally acceptable in machines for regular commercial work.

Still another design philosophy is that taught by Bockman and Li in their patent document mentioned earlier. That philosophy calls for memorization of a large number of device color states distributed substantially throughout the color-solid gamut or the apparatus.

This philosophy too clearly is suited only for a relatively specialized and relatively high-end system. Even so, retention of that rather monumental amount of data does not alone necessarily ensure absolute uniformity of the rendered colors as among different unit printers of the product line.

(c) A more-demanding context—In another printing environment, particularly for use in multitasking machines such as designed for very-short-run commercial printshops, the normalization and linearization procedures outlined above would result in a greater error, which would be unacceptable for routine commercial work. One major reason for this is that in the highly competitive multitask market inkjet dropweights are substantially more variable.

In particular whereas nominal dropweight in such a machine may be 3.25 ng, economic considerations dictate that production tolerances in nozzle, heater, firing chamber and ink characteristics permit high-weight values as great as 4.5 ng. Such dropweights produce correspondingly elevated dot sizes and accordingly—when such dots merge on the printing medium—maximum tones that are subject to a magnified luminosity error 15 (FIG. 3).

For the dropweight variation just specified, this error is roughly 5 dL* units. The tone density is higher than nominal, and luminosity accordingly 5 units lower. This is an example of system performance if doing only primary linearization.

In the graph, the curved lines 16, 17 exhibit the raw LCR data for the nominal-dropweight and high-dropweight printheads respectively. In other words, these curved lines 16, 17 represent the intrinsic or natural responses of the apparatus, and most particularly of area-filling geometries for different ratios of inkdrop diameters to the spacing-apart of inkdrop centers. These area-filling geometries are further perturbed and greatly complicated by divergent coalescence behavior of different-size inkdrops, and of inkdrops on different printing media, and of inkdrops under various operating conditions.

The distance between inkdrop centers is defined by pixel dimensions. These pixel definitions in turn are set by two sets of machine operating parameters:

(1) the firing frequencies along each row—thus establishing pixel-column spacings—and
(2) printing-element spacing along the print-element arrays, and print-medium advance distance—which establish pixel-row spacings.

Unfortunately the geometrical relationships between inkdrop areas and spacings cause printed tonal ramps to be nonlinear in tonal steps, even when the nominal inking density—as defined in terms of fractions of pixels inked—is increased in linear steps with a single drop diameter.

Not only are the relationships between pixel-fraction inking and actual area coverages nonlinear, due to these geometrical factors, but in addition the specific nonlinear behavior itself varies with inkdrop diameter. This is the reason for the difference in endpoints 62, 64 of the natural response curves 16, 17 obtained for data from two printheads with different dropweights.

The luminosity discrepancy 15 appears at the low-luminosity end 62, 64 of the printer dynamic range—i.e. the high-density operating cutoff points. This is so even though at the high-luminosity end 69 the same curves 16, 17 are aligned.

The dashed straight lines 18, 19 exhibit the results of linearizing those two data sets with the nominal- and high-dropweight printheads respectively. Earlier artisans in this field—particularly in the related work discussed in subsection (b) above—have substituted these rectilinear responses 18, 19 are substituted for the intrinsic or natural curvilinear responses 16, 17 of the apparatus, by preadjusting the image data (before print-masking).

Those substitutions were definitely beneficial. They are a fundamental first step toward systematic control of colorimetric linearity in primary colors—and thereby toward orderly combinations and relationships among the secondary and other constructed colors that result from grouping primary-ink dots together. The color-combining properties articulated by Grassman's laws, and assumed in maneuvering within color space, rely upon such linearity.

Such preadjustments can be first grasped at a conceptual, graphic level as application of a conversion function 61, 63 (FIGS. 4 and 5) that is simply complementary to the intrinsic or natural transfer function 16 or 17, respectively of the apparatus. This conceptual representation resides in the generally symmetrical shape of the conversion functions 61, 63 relative to the natural response functions 16, 17 respectively—particularly when viewed as referred to the desired ideal straight-line responses 18, 19 respectively. Curves for the conversions 61, 63 are upward-concave; for the natural responses 16, 17, -convex.

To promote this conceptual understanding, in FIGS. 4 and 5 the correction functions 61, 63 are positioned in alignment with the original, natural responses 16, 17. In particular, in the nominal-dropweight case both the original response 16 and the corresponding correction function 61 diverge from a first common, high-luminosity point 69.

They reconverge at the low-luminosity ends in a second common point, the high-density cutoff 62. Analogously in the high-dropweight case both the original response 17 and corresponding correction function 63 diverge from a first common, high-luminosity point 69 and reconverge in a common low-luminosity cutoff point 64.

There is, however, no crosstalk, or causality as between the two cases. That is to say, nothing in either FIG. 4 or FIG. 5 has any influence on phenomena graphed in the other of these two illustrations.

In these conceptual illustrations (which are not to scale) the magnitudes of the corrections actually are represented by the differences between the correction functions 61, 63 and the ideal, rectilinear functions 18, 19. (This is roughly only half the difference between the illustrated correction functions 61, 63 and the natural responses 16, 17.)

A somewhat more quantitative grasp (though still not to scale) of the correction functions 61, 63 may be obtained by considering the same two functions shown alternatively as additive signal corrections $\Delta S$ and multipliers M (FIG. 6). As a practical matter, these corrections can in fact be readily derived and then applied either as additive functions $\Delta S$, 61, 63 or as multiplicative functions M, 61, 63.

Thus the additive adjustments $\Delta S$ are pictured here as referred to a zero (0.0) baseline, whereas the multipliers M are shown referred to a unity (1.0) baseline. In each of these two cases, the right-hand (high nominal density) end of the correction curve 61 or 63 ends at the same level (0.0 or 1.0 respectively) as the left-hand (low nominal density) end.

In either event the correction terms $\Delta S$ or correction factors M do not represent mere observed errors or desired compensations. Rather these quantities are physically applied to modify input image data before halftoning—to effectuate an actual and precise linearization within the operations of a given single printer.

No such linearization, however, can cure the problem of the endpoint or cutoff-point divergence 15 (FIG. 3). This degree of divergence is readily noticeable even in a single-primary-colorant region of an image.

If such a single primary colorant is combined with another primary, this divergence goes far beyond being readily noticeable, and can be extremely conspicuous in terms of hue distortions. It is particularly conspicuous if the dropweight of that other colorant is nominal or relatively low.

Another factor that greatly exaggerates tonal error due to dropweight variation is use of so-called "light" inks: for example, light magenta or light cyan. For such colorants a curve of luminosity vs. colorant pixel density ends at various points, without at all approaching a saturation point for the full-strength colorant—i.e. any tone corresponding to an almost-constant $L^*$ value.

Using such inks, no approximation or simplification is available to circumvent the tonal and hue errors that can survive these earlier linearization systems. The distribution of errors considered statistically—in particular the 95% error, would also be roughly 5 $dL^*$.

(d) Conclusion—Thus color inconsistencies among different printers within a single product line have continued to impede achievement of uniformly excellent inkjet printing—at high throughput—on all industrially important printing media, but still at minimal cost such as associated with a low-end multitasking printer. Thus important aspects of the technology used in the field of the invention remain amenable to useful refinement.

SUMMARY OF THE DISCLOSURE

The present invention introduces such refinement. In its preferred embodiments, the present invention has several aspects or facets that can be used independently, although they are preferably employed together to optimize their benefits.

In preferred embodiments of a first of its facets or aspects, the invention is a method of color-calibrating an incremental printer. The method includes the step of, for each of plural colorants respectively, defining at least one standard maximum tone.

It also includes the step of establishing an absolute perceptual parameter of the at least one defined maximum tone. The method further includes the step of—in substantially each printer or printer driver of a product line—storing a numerical representation of the established absolute parameter for later use in color-correction calculations for the printer.

The term "plural colorants" used above does not necessarily mean all the colorants that are in use in the printer. The invention yields its greatest benefits when applied with respect to colorants that are hardest to roughly standardize by other methods—as, for instance light colorants (e.g. light magenta, light cyan).

The invention has perhaps least impact when applied with colorants that are easiest to roughly standardize by other techniques—particularly black. As a matter of preferences, the "plural colorants" mentioned above include at least all the chromatic colorants in use.

The phrase "at least one standard maximum tone" is intended to encompass three variants:

preferably at least one such tone as printed using each combination of printmode and printing medium for which the printer is intended; and possible updated tones or established perceptual values that may be made available (e.g. via the Internet or other network, or on a floppy disc) for use in the printer after sale.

Other variations, however, are within the scope of this language.

The foregoing may represent a description or definition of the first aspect or facet of the invention in its broadest or most general form. Even as couched in these broad terms, however, it can be seen that this facet of the invention importantly advances the art.

In particular, this aspect of the invention recognizes that the inability of earlier procedures to provide a standardized color performance throughout a population of color printing machines is a problem that flows first from an absence of any standard—and then furthermore from an absence of characterizing information about such standard. The first aspect of the present invention accordingly both defines a standard and establishes a quantification of it.

Because the second step is not in absolute, not relative terms it is portable—i.e., susceptible to being stored in one place and environment, for recall later in a different environment and place to guide a control paradigm that in fact produces standardized color. The invention does not, however, specify memorization of an entire three-dimensional color calibration—but rather resolves the problem in an elegant fashion that invokes only a very minimum of data-storage and computational resources.

Although the first major aspect of the invention thus significantly advances the art, nevertheless to optimize enjoyment of its benefits preferably the invention is practiced in conjunction with certain additional features or characteristics. In particular, preferably the storing step is performed before distribution of the respective printer from a manufacturer of the printer.

In case this basic preference is observed, then a subpreference is that the storing step be performed again for a revised, second defined standard maximum tone after distribution. This preference is articulated here simply to echo the point, made earlier, that the concept of "at least one maximum tone" encompasses plural such tones defined sequentially over time. In other words the invention is amenable to revision of standards for an entire product line, should that become desirable—as for example on account of shifts in industrial practice or even specified standards in the trade, etc.; or even such relatively routine matters as reopening the definition of media sets to be used with the printer.

Other basic preferences are that:

the defining, establishing and storing steps be performed for at least one nonchromatic colorant and at least one chromatic colorant in the printer;

for at least one chromatic colorant the defining, establishing and storing steps be performed for plural combinations of printmode and print medium used in the printer;

the defining and establishing steps include measuring the absolute perceptual parameter for a representative printer in the product line—or alternatively measuring the absolute perceptual parameter for each of representative printers in the product line, and selecting from among the measurements; or measuring the absolute perceptual parameter for each of representative printers in the product line, and combining the measurements;

the defining, establishing and storing steps operate with respect to substantially exclusively a single tone for each colorant, as distinguished from recording an entire colorimetric calibration throughout a tonal range—so that the invention does not under-take to memorize device states or the like within an entire color-calibration solid as generally taught by the patent document of Bockman and Li; and the method further include the step, performed in an end-user facility, of automatically applying the stored numerical representation in calculations for color correction in the printer.

If this last-mentioned basic preference is in effect, then it is further preferred that, for each chromatic colorant respectively, the applying step include contracting or expanding the printer dynamic range to force a maximum tone printed by the printer to match the defined standard tone. This subpreference as to dilation of dynamic range, in turn, is subject to several subsidiary preferences.

One of these is that the defining and establishing steps include determining the absolute perceptual parameter for printers that represent extremes of performance of the product line. In this case the defining and establishing steps go on to selecting the numerical representation—and selecting printer operating conditions—in view of the determined parameter for the extremes of performance, in such a way as to ensure that in each printer of the product line the applying step will be able to force the maximum tone to reach the standard value.

Another of the several subsidiary preferences is a three-part provision—namely, that (1) the method further include the steps of, in the end-user facility but before the applying step, using the printer to print a specimen of the maximum tone, and measuring the absolute perceptual parameter for the specimen; and (2) the applying step further include employing the measured parameter for the specimen, as an instance of the maximum tone printed in the absence of the contracting or expanding; and also (3) the contracting or expanding include forcing the measured absolute perceptual parameter for later-printed instances of the maximum tone to match the established absolute perceptual parameter for the defined standard tone.

Another subsidiary preference, within the range-dilation subpreference mentioned above, is that the applying step further include linearizing later printing of the respective colorant, using the forced match as one endpoint of the linearizing. Yet another such subsidiary preference is that the contracting or expanding include cutting off maximum tonal density early for marking arrays that are marking too boldly; and also include extending maximum tonal density to cut off late for marking arrays that are marking too lightly. (Here the words "early" and "late" are used not in a temporal sense but rather in the sense of points along a progression toward the maximum-density end of the dynamic range.)

Another secondary preference, relative to the basic preference of automatically applying the stored number in calculations, is that the applying step include introducing the correction upstream of printmasking. It is also very highly preferable that the method include, in the data-collection laboratory stage, determining the maximum tone printed under worst-case or extreme operating conditions—so that the standard tone or tones, and also many other operating parameters, can be selected in such a way as to be certain that every printer in the line will be able to reach the standard tone.

In preferred embodiments of its second major independent facet or aspect, the invention is a method of color-calibrating an incremental printer in an end-user facility. The method includes the step of, for each of plural colorants in the printer retrieving from the printer or a printer driver a stored numerical representation of an absolute perceptual parameter for a standard maximum tone.

It also includes the step of applying the retrieved numerical representation in color-correction calculations for the printer. (The previous discussion of "plural colorants" is applicable here as well; and, within the literal meaning of the language here, in general the printer may retrieve one or more such stored numbers, for one or more such tones.)

The foregoing may represent a description or definition of the second aspect or facet of the invention in its broadest or most general form. Even as couched in these broad terms, however, it can be seen that this facet of the invention importantly advances the art.

In particular, this second aspect of the invention is complementary to the first. It is this present facet that undertakes to make active use of available quantitative information in actually physically manipulating the operation of a printing machine to behave according to the established standard. The inventors believe that this has never been done before in an incremental color printer.

Although the second major aspect of the invention thus significantly advances the art, nevertheless to optimize enjoyment of its benefits preferably the invention is practiced in conjunction with certain additional features or characteristics. In particular, preferably for each chromatic colorant respectively the applying step includes contracting or expanding the printer dynamic range to force a maximum tone printed by the printer to match the defined standard tone.

In event this basic preference is observed, then preferably the method further includes the essence of the three-part preference described earlier—namely (1) inclusion of the step of, before the applying step, using the printer to print a specimen of the maximum tone, and measuring the absolute perceptual parameter for the specimen; (2) that the applying step further include employing the measured parameter for the specimen as an instance of the maximum tone printed in the absence of the contracting or expanding; and (3) that the contracting or expanding include forcing the measured absolute perceptual parameter for later-printed instances of the maximum tone to match the established absolute perceptual parameter for the defined standard tone.

Another subpreference is that the applying step further include linearizing later printing of the respective colorant, using the forced match as one endpoint of the linearizing. Yet another is that the contracting or expanding include cutting off maximum tonal density early for marking arrays that are marking too boldly, and extending maximum tonal density to cut off late for marking arrays that are marking too lightly.

Other preferences also mentioned earlier, in connection with the first major aspect of the invention, are that the applying step include introducing the correction upstream of printmasking; and the method further includes the step of, before the retrieving step, downloading from a network an updated value of the numerical representation. Another basic preference is that the applying step be performed in the printer by integrated circuits operating programs.

In this last-mentioned case it is also preferred that the applying step set the maximum tonal density that the printer can image, to match the stored numerical representation. Another preference is that the method, still for each colorant, further include the step of printing a tonal ramp. Here the measuring step includes using a calibrated line sensor to measure the printed tonal ramp.

When the line sensor is thus used, preferably this using includes these substeps:

assembling a set of sensor readings for each tone in the ramp;

normalizing the readings with respect to the tonal range between reflection from unprinted printing medium and the maximum tone; and based upon nonlinearity in the normalized, adjusted and referred readings, determining a correction function to establish linearity in the readings.

In preferred embodiments of its third major independent facet or aspect, the invention is a method of providing substantially absolute color standardization in substantially all incremental printers of a product line. The method includes the step of, for at least one chromatic colorant, storing—for access by each printer—a numerical representation of an absolute perceptual parameter for at least one tone.

The method also includes the step of later retrieving and applying the stored representation to establish the printer dynamic range. The foregoing may represent a description or definition of the third aspect or facet of the invention in its broadest or most general form.

Even as couched in these broad terms, however, it can be seen that this facet of the invention importantly advances the art. In particular, while the above-discussed first two aspects focus piecemeal upon—respectively—establishment of a standard and its retrieval for use, this third facet contemplates the invention from a more—global perspective of the overall process.

This facet of the invention solves the problem of color uniformity by creating a process that directly grips and manipulates the entire printer dynamic range to a standard condition. This is based, however, simply and ingeniously on specification of at least one tone (one of which is preferably equal to a maximum tone, as will be seen)—not on a detailed calibration pervasive to the entire operating gamut.

Although the third major aspect of the invention thus significantly advances the art, nevertheless to optimize enjoyment of its benefits preferably the invention is practiced in conjunction with certain additional features or characteristics. In particular, as noted above the at least one tone preferably includes a tone that is equal to a maximum tone. Also preferably the storing step includes placing the numerical representation in each printer or raster-image processor ("RIP") to be associated with each printer; or in a software cache accessible to each printer or raster-image processor.

In any of these cases it is further preferred that the placing include memorizing the numerical representation in a read-only memory ("ROM") or an application-specific integrated circuit ("ASIC"). As is well known, ROM types are available in a great variety—including programmable (PROM), erasable (EPROM), and electrically erasable (EEROM, EEPROM). Another, alternative, preference is that the storing step include placing the numerical representation in a printer driver used by each printer.

Yet another preference is that the applying step include closed-loop control based upon printing a test pattern that nominally includes the maximum tone; and measuring the test pattern with a calibrated sensor to derive a comparable absolute perceptual parameter for the nominally included maximum tone. In this case a subpreference is that the closed-loop control include first comparing the stored numerical representation of the perceptual parameter with the comparable measured perceptual parameter; and then, from differences found in the comparison, deriving a correction function to be applied to image data in future printing.

Another subsidiary preference is that the function include a correction, based on the retrieved at least one tone, that causes the printer perceptual output tones to be a linear function of input data level. Yet another preference is that the storing step include storing numerical representations for plural tones; and the retrieving step include retrieving the representations of the plural tones; and the function include a correction, based on the representations of the plural tones, that causes the printer perceptual output tones to be a nonlinear function of input data level.

A further subsidiary preference is that the closed-loop control also include, in future printing, applying the correction function to image data.

Yet another, more basic preference is that the storing step include storing a numerical representation of a standard value of the absolute perceptual parameter; and also in this case that the method further include the steps of:

determining the absolute perceptual parameter for printers that represent worst-case performance within the product line, and selecting the numerical representation and selecting printer operating conditions in view of the determined parameter for the worst-case performance, to ensure that in each printer of the product line the applying step will be able to force the dynamic range to encompass the standard value All of the foregoing operational principles and advantages of the present invention will be more fully appreciated upon consideration of the following detailed description, with reference to the appended drawings, of which:

BRIEF DESCRIPTION OF THE DRAWINGS

FIG. 14 is a tabulation of all the perceptual parameters stored in a preferred embodiment of the invention.

DETAILED DESCRIPTION OF THE PREFERRED EMBODIMENTS

1. Basic Automatic Linearization in the Field

Preferred embodiments of the present invention have some elements in common with earlier work. A general principle is the measuring of reflected energy from primary color tiles or patches of graduated tonal density or darkness which are illuminated with a narrow-band light source (e.g. a light-emitting diode, LED).

Such operation is analogous to that of a classical densitometer. The reflected energy is received by a sensor, whose electrical output signal is correlated to measured luminosity $L^*$ and yellow-blue chrominance $b^*$ via lookup tables.

In other words, reflectance-indicating signals are converted into $L^*/b^*$ estimates using these tables. The estimated $L^*$ and $b^*$ values in turn are used to correct the printing system back to a known linear tonal response to input data.

(The invention is not limited to forcing a tonal response that is linear; another, different function can be adopted instead—and in this case it is likely to be preferable to select and store plural standard points along the tone gamut, rather than only a maximum tone. In addition, in purest principle the invention can be practiced using a stored tone which is not at the extreme maximum end of the tonal range, and this is within the scope of certain of the appended claims.)

The origin of the lookup tables is outside the linearization process itself. These tables are usually prepared in the factory for each printer with its line sensor installed, but can instead be prepared automatically by the printer itself based upon theoretical analysis of the inks and printing media to be used. Both these approaches are discussed in, for instance, the first of the earlier-mentioned Subirada patent documents.

Figure 7:
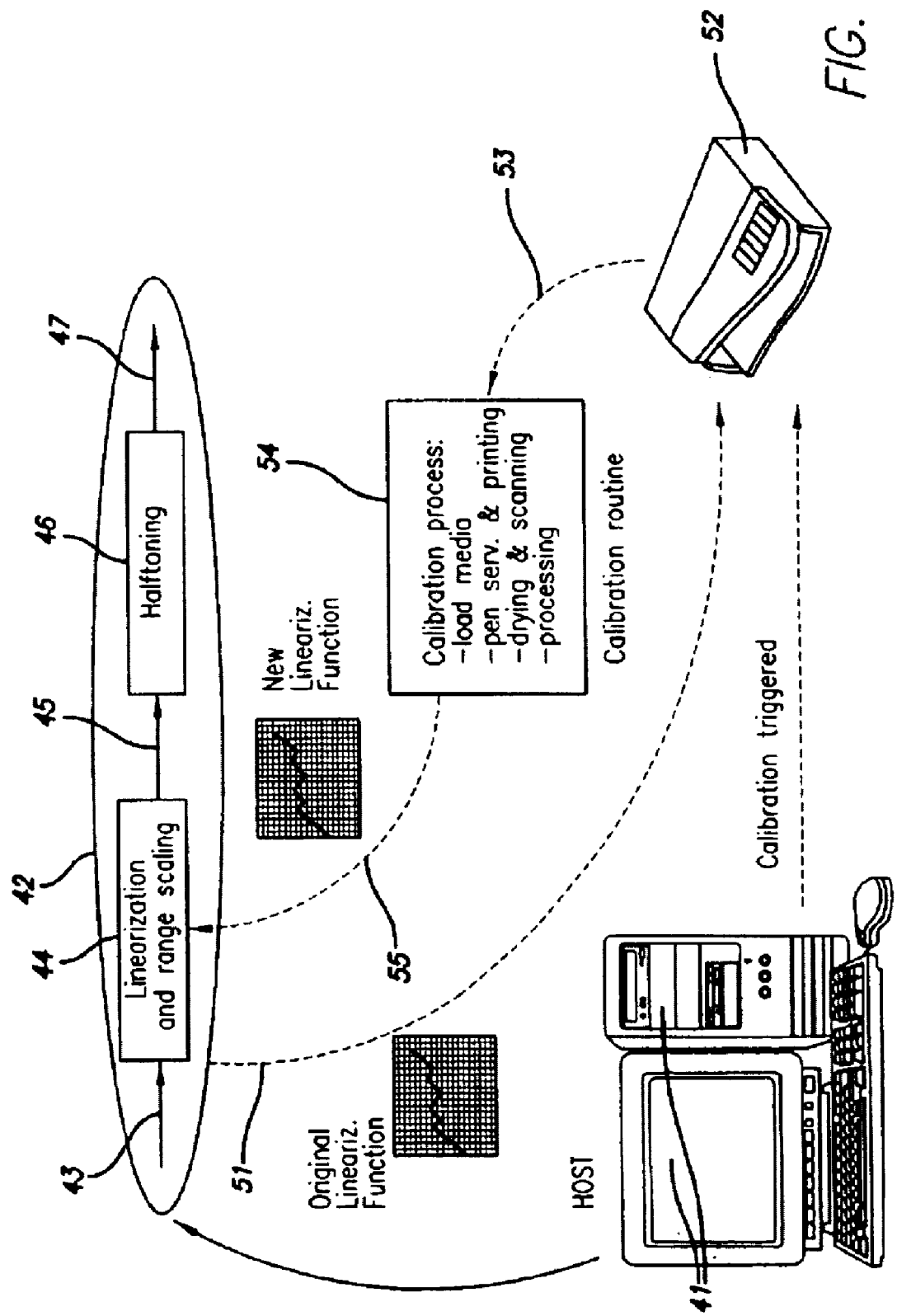
FIG. 7 is a flow chart, also highly conceptual and schematic, showing routine color correction with the invention in place—and also diversion of information flow for recalibration of the color-correction stage.

In one conceptualization of the linearization process, the objective is to refine a preexisting data pipe-line 42 (FIG. 7). This pipeline may be partly in a computer 41 that is associated with a printer 52, and may be partly in the printer itself, and also may be partly in a raster-image processor (not shown) associated with the computer 41 and printer.

The pipeline 42 receives input image data 43 from an externally supplied file, or from an original file that may have been just developed in the host computer 41. The input data 43 are first passed through a linearization stage 44 to compensate for known nonlinearities in the printing system—determined in some previous linearization process.

Linearized image data 45 are then subjected to halftoning 46, and passed 47 to final output printing stages. Such correction is very roughly analogous to a gamma correction in a cathode-ray-tube (CRT) system. Although only primary colors are linearized directly, secondaries too (formed from the primary colors) are corrected by virtue of the correction to the primaries.

The preexisting linearization 44 could be discarded, and an entirely new transfer function recomputed from wholly uncorrected data—and the resulting process would be within the scope of certain of the appended claims. Such an approach, however, would result in poorer accuracy than the preferred method, which as noted above is refinement of a preexisting approximation to linearization.

The refinement approach is better able to determine final small corrections very sensitively. This procedure is initiated either by a user or automatically by the host computer 41 (or even the printer 52).

Upon initiation of the relinearization, the original linearization functions 51 are channeled to the printer 52, which invokes 53 a programmed series of steps 54—to be discussed in detail below. The result is a new set of linearization functions 55, which then are substituted for the preexisting ones previously in the pipeline.

Figure 8:
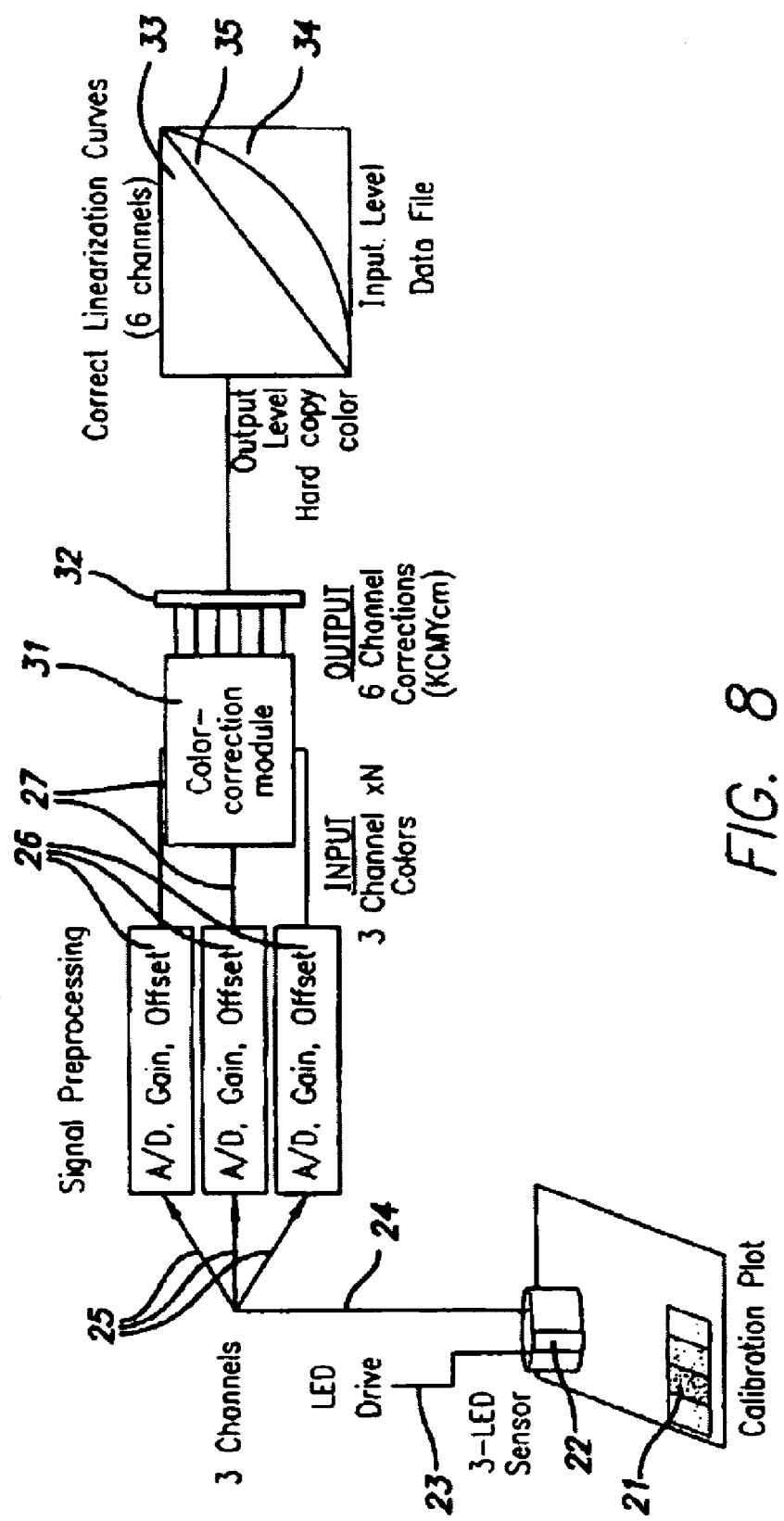
FIG. 8 is a block diagram, also highly schematic, showing a test pattern—and also system modules that read and interpret the test pattern—to effectuate the FIG. 7 recalibration.

The basic color-linearization procedure, i.e. the series of steps 54 mentioned above, is as follows.

printing: A closed-loop color target 21 (FIG. 8), consisting of primary color ramps of different ink quantities, is halftoned and printed in the usual way—using all of the default (i.e. routine) settings and system configurations.

scanning: After allowing the ink to dry (preferably using a default drying-time algorithm), the system scans the target using the optical sensor 22 that is a standard part of the printer—and is commonly known as a "line sensor" or "color sensor". It has preferably three light-emitting diodes (LEDs)—amber, green and blue respectively—to provide illumination throughout the visible spectrum, for best sensitivity to the cyan, magenta, yellow and black colorants.

The sensor also has a single photodiode as detector. The LEDs are powered by a drive circuit 23 synchronized with detection, for clear separation of color effects when desired.

signal preprocessing: Preliminary signal preparation 26 provides digital form, independent gain adjustment for the respective color-signal channels, filtering and averaging. (At an even earlier, preliminary stage a black-point measurement is also used for setting of electronic gain and offset values; that routine operation, sensing the darkness in a hole provided in a printhead service-station region, is apart from the present invention.) Then the still-raw sensor readings 27 undergo color correction 31 (using the sensor precalibration mentioned above).

A first step here is conversion into perceptual parameters—luminosity or chrominance. More specifically, readings for the yellow Y ramp are translated into yellow-blue chrominance b*; and for all the other ramps, into luminosity L*. These others include black K, cyan C, and magenta M; but also light cyan c and light-magenta m if the printer has these supplemental colorants.

The special treatment for Y is adopted to overcome relatively low contrast in the luminosity scale for yellow. As is well known, such low contrast is essentially an intrinsic property of yellow; this approach to measuring yellow is known in the art.

(The sensor as calibrated in its lookup tables yields perceptual values that still are good only for the purposes indicated, i.e. for measuring primaries within the small range of the primary color variations—which is the operating range. Here the precision and accuracy are adequate; but the sensor as thus calibrated should not be used for measuring any secondary or other constructed color.)

tonal linearization: Still in the correction stage 31, the perceptual measurement values L* and b* pass to a linearization substage 32, typically embodied in part of the printer firmware. Here the preprocessed measurements are used to adjust the relationship 33 between hardcopy output colors and input levels in each image data file.

In other words, this stage 32 calculates new linearization transfer functions 34 for each colorant channel—that is, for such of the KCMYcm colorants as are used in the machine. These functions are such as to force the tone response 35 of each colorant to be linear: i.e. linear in b* for Y, and in L* for the others.

The specific nature of these transfer functions 34 departs importantly from the conversion terms ΔS, 61, 63 and conversion factors M, 61, 63. These functions are discussed in further detail in subsection 2 below.

storage: The transfer functions are passed to the host computer via a communication link. The collaborative apparatus consisting of the computer and printer then applies the functions at appropriate points in the data pipeline.

2. Near-Absolute Color Correction

As explained earlier, a drawback of the related art is inconsistent color—as between plural and multiple printers within a single product line. Such inconsistency can be traced directly to essentially three limitations in the related systems:

arguably inadequate sensor calibration;

no absolute full-saturation reference value; and no objective to eliminate intraline inconsistency.

The first of these is significant because the color differences of interest here are relatively small in magnitude. Therefore they could be swamped out—or in any event rendered badly imprecise—by relatively small calibration variance such as may perhaps persist in some or all of the systems described in the earlier-mentioned Subirada patent document.

The second is critical even if sensor calibration is adequate. In the absence of a nominal maximum-tone reference for the product line, there is nothing with which to match each production printer in the line.

The third is essential because availability of information is not the same thing as its actual use. That is to say, actual intraline consistency requires an actual procedure that indeed makes use of both adequate sensor-calibration data and a maximum-tone reference value.

The present invention addresses all three of the limitations outlined above. Thus first, if desired, the invention can eliminate possible imprecision or inaccuracy of sensor-signal calibration into a perceptual color space (due for example to uncertain assumptions about media independence of sensor calibration).

This step is a matter of calibrating the line sensor separately and specifically with each different printing medium that is intended for use with the printer. Once given an absolute calibration to perceptual space, the sensor is ready to measure actual full-saturation tones in the printer—in a way that will later yield measurements directly comparable with lab measurements of nominal or standard full-saturation tones.

Second, in preferred embodiments the invention defines and measures a nominal reference tone 62' (FIG. 9) for full saturation of each colorant that the printer product line uses. Thereby not only is the high-luminosity end 69 (FIGS. 3 through 5, and FIGS. 9 and 10) of the dynamic range well defined—through printing and measuring on the bare printing medium—but the low-luminosity (or high-chrominance, for yellow) end 62' too is well defined.

That cutoff point is explicitly defined and measured as a standard for the product line. (For simplicity in the drawings, FIGS. 9 through 12 illustrate essentially a first linearization, for each of the various cases, rather than the preferred relinearization 51–55 [FIG. 7] discussed earlier; illustration of the fine corrections in such a relinearization would be difficult to show and see, for the very reason of their being very small refinements of the previous correction values.)

Figure 1:
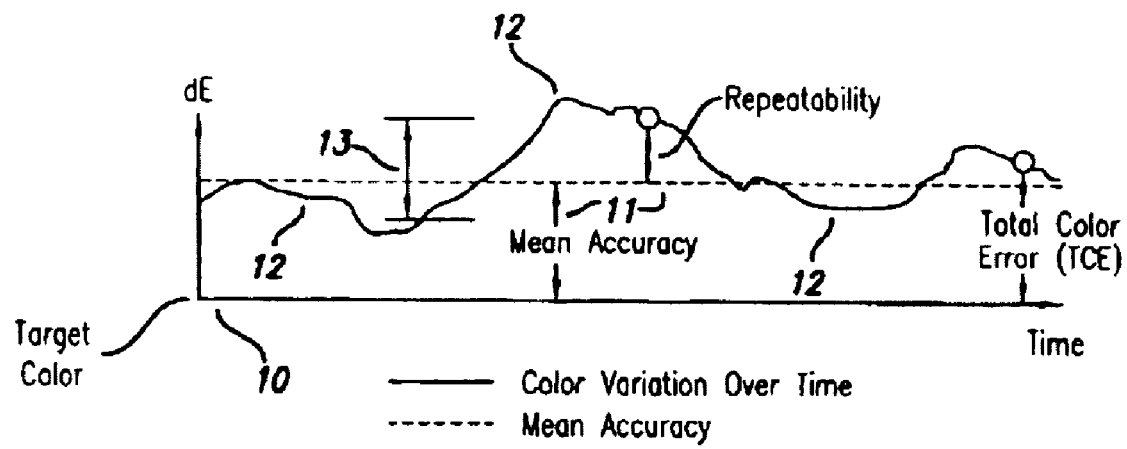
FIG. 1 is a diagram, highly schematic and not to scale, illustrating accuracy and repeatability concepts applicable to the invention—the ordinate representing magnitude of the various forms of possible error, and the abscissa representing time (and also, being at the zero-error point, representing a target color)
Figure 2:
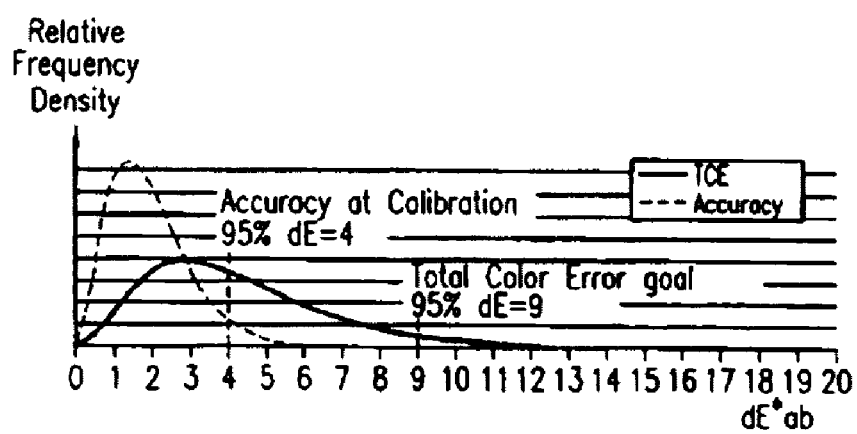
FIG. 2 is a color-error probability distribution representing color goals and performance in a printer product line.
Figure 3:
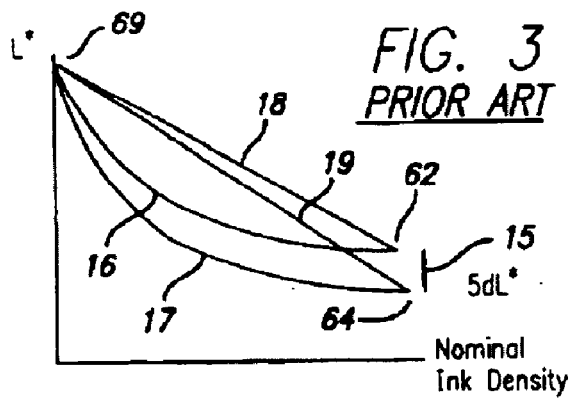
FIG. 3 is a graph (not to scale) of luminosity vs. nominal inking density for uncorrected printer response and also for linearized response, after a conventional linearization procedure (i.e. without standardization of color, and accordingly showing uncertainty or error at the full-inking point) for two printing arrays that mark with different boldness: one inking nominally and the other inking overboldly.

Comparing the nominal tone 62' (FIG. 9) with FIG. 3, in which the upper curve 16 represents the natural system response in a printer that has a nominal-dropweight printhead, it can be seen that this second provision of the invention simply establishes the nominal maximum tone or cutoff for a nominal printhead. This step cannot be performed in the field (i.e. in an end-user's facility)—or even at the factory, in the sense of being any part of the production-line procedures—because this is a step which must be performed on behalf of the entire product line.

Accordingly the definition and measurement parts of the preferred embodiments are performed at a product-design or -redesign stage. In usual idiom such measurements are performed in the "laboratory" rather than the factory.

The definition step preferably includes printing test patterns with a representative sampling of production prototype printers, and the readings compared and combined to obtain a composite that can then be treated as nominal and standard for the product line. This printing is done not only with actual printers representing the product line but also with the ink-and-printing-medium sets that will actually be used, to optimize the readings specifically for those ink-medium sets.

Most highly preferred practice of the present invention includes measuring the standard cutoff tones 62' using a high-quality photometer, for instance an automatic recording double-beam spectrophotometer with a reflectance attachment. Within the scope of certain of the appended claims, however, are many less-stringent approaches.

These include using a handheld calorimeter of the kind described in the coowned U.S. Pat. No. 5,272,518 of Vincent, or using a printer-mounted one such as taught in another coowned patent of Vincent, U.S. Pat. No. 5,671,059 and in the above-mentioned patent document of Thomas Baker, or even using the calibrated onboard line sensors in the printers themselves—e.g. even those printers used to produce the standard tone printouts. What is key is to obtain a tone reading that is susceptible to direct and reasonably reliable comparison with sensor readings that will later be made automatically in the field by printers in the product line.

In purest theory even an arbitrary tone reading could be used as a standard. Such a choice, however, in general would fail to make best use of the dynamic range—and thus the intrinsic color gamut—of the printer.

It is important that the measurements include checking the product line and its design to determine worst-case values for dropweight and other parameters that closely affect inking density, particularly at the maximum-tone end of the dynamic range. The standard value to be stored—and also all the other operating conditions of the printer—should be chosen so that every printer in the product line, even if it is operating at an extreme of operating performance, be able to reach the standard values established and stored.

While definition and measurement are clearly laboratory rather than factory operations, the next step—storage of the resulting reference data—may be regarded as a closer case, since these data are in fact stored in each printer on the production line. The manner in which the data are primally stored, however, usually involves embedding the information in design data for an ASIC or some type of ROM.

Development of such design data is commonly seen as a laboratory (not factory) function. Engineers prepare not only abstract numerical descriptions of the data but also lithographic or like masters to be later used directly in fabrication of the multiple layers of integrated circuits—or, in some cases, prepare master data blocks for loading into firmware memories. The engineering tasks are performed in the lab.

The ASIC or ROM, however, is then manufactured in large quantities, automatically following the laboratory-developed specifications. This manufacturing step, regardless of whose facility performs it, is essentially a factory operation.

At the factory, each ASIC or ROM is then installed into a respective one of the printers in the production line. It is unclear whether the "data storage" occurs at the early instant of lab embedment of the information in fabrication masters, or at the later instant of automated realization of the embedded information into production components.

As can be seen, it is basically a semantic question whether the storage step is a laboratory or factory function. In any event the definition, measuring and storage are all parts of an overall procedure for practicing preferred embodiments of the invention; and these parts are all performed either for or on behalf of the printer manufacturing company.

Third, the invention calls for use of the stored full-saturation reference tone in an automatic field procedure that actually forces 115 (FIG. 9) the low-luminosity point 64 for a nonnominal-dropweight printhead to match the adopted standard 62' for all units in the product line. With that point under control, near-absolute calibration can then be completed by an essentially common linearization in which the entire natural response curve 117 for a nonnominal head is replaced by a substantially linear response 119 that drives to the standard low-luminosity level 62'.

Furthermore that entire linear response 119 of the thus-corrected nonnominal head is very nearly congruent with the entire linear response 118 of a nominal head. The invention thus comes very close to erasing visible traces of the distinction between nominal and nonnominal printheads: not only intramachine linearity but also intraproduct-line near-absolute consistency is the result.

It is in this part of the procedure that the defined, measured and stored tone actually comes into physical being—in the sense of its being physically, colorimetrically replicated as:

a tonal value which the printer will actually print whenever the low-luminosity tone is specifically invoked by input image data; and also a tonal value to which the printer linearizes nearly all other tones within its dynamic range.

(The word "nearly" is included here because the stored low-luminosity tonal value in principle has no effect at all on the single tone at the extreme high-luminosity end of the range. In addition, in some cases it is possible that some tones immediately adjacent to that one may not be affected by the standard low-luminosity value.)

Figure 10:
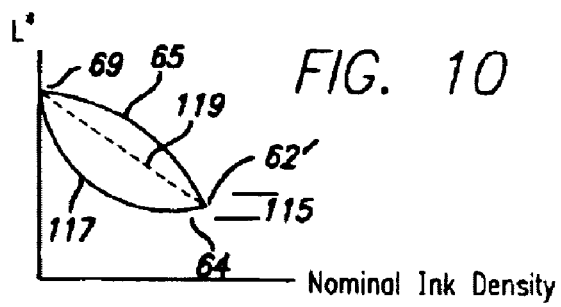
FIG. 10 is a graph like FIG. 5, for the overbold-inking array, but showing a superposed correction function according to the invention rather than a conventional function.
Figure 11:
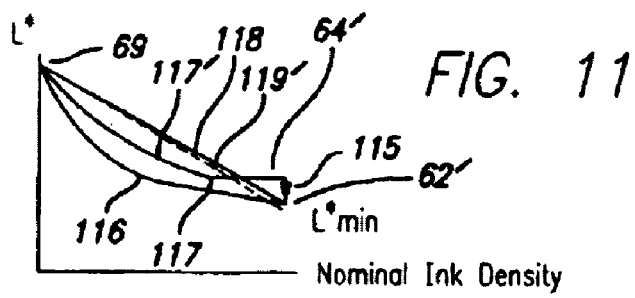
FIG. 11 is a graph like FIG. 9 but for an overlight-inking array rather than an overbold one.
Figure 12:
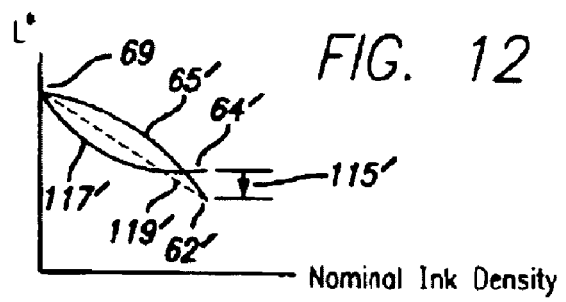
FIG. 12 is a graph like FIG. 10 but for the overlight-inking array of FIG. 11.

The physical forcing of the low-luminosity endpoint 64 to the stored value 62' is accomplished by an entirely new set of conversion terms or factors 65 (FIG. 10). By comparison with the previously discussed conceptual showings in FIGS. 4 and 5, it can now be seen that—unlike the previously stated absence of causal connection between the nominal and nonnominal cases—there is now a crosstalk or causal relation between the two cases.

More specifically, here the conversion function 65 links the two cases by making the nonnominal machine act just as the nominal machine acts. The right end of the conversion function 65 (and linearized response 119) no longer converges to the right end of the natural nonnominal response curve 117 as was the case in the related art.

Figure 4:
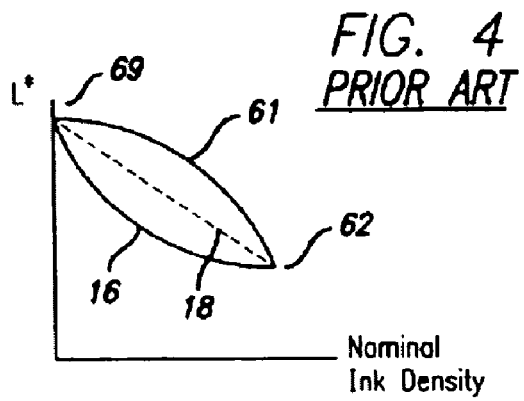
FIG. 4 is a like graph of response following a conventional procedure, but for only a nominal-inking one of the two arrays assumed in FIG. 3—and also incorporating expressly a superposed correction function that is only implicit in FIG. 3.
Figure 5:
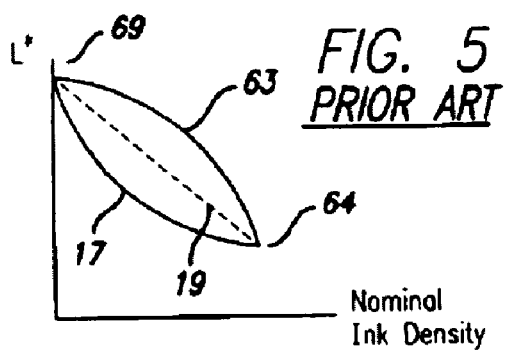
FIG. 5 is a like conventional graph for the other, overbold-inking one of the arrays assumed in FIG. 3.

This conversion function incorporates within it the necessary step 115 (upward for a high-dropweight head). Therefore the new function 65 is not merely a conceptual-mirror-image complement of the natural response 117—as were the functions 61, 63 (FIGS. 4 and 5).

Figure 6:
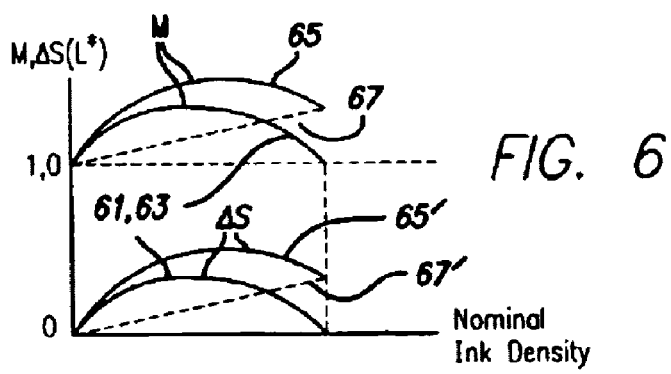
FIG. 6 is a comparable set of graphs of only the two FIG. 4 and 5 correction functions—shown in both multiplicative and additive forms—but without the uncorrected response.

Another comparison of the correction function 65 with the earlier forms appears in the earlier-discussed graph of the function as a multiplier M, 65 (FIG. 6). This view offers another kind of direct graphical comparison with the functions 61, 63 used heretofore.

Here the new multiplier 65 is seen to depart from the earlier ones in that the right end of the graph does not return to the base level 1.0 but rather ends at an elevated position. When this multiplicative correction function 65 is applied to the original nonnominal response function 117, the curvilinear components of the two functions 65, 117 neutralize one another—yielding a rectilinear overall response, which may be seen as an inclined straight line 67.

The fact that this line 67 is angled toward the elevated position reveals that one component (the vertical step) of the overall correction is not merely neutralizing nonlinearities. Rather it is directly forcing the low-luminosity cutoff of the dynamic range in hardcopy printouts to match the same standard low-luminosity cutoff figure stored in the laboratory.

Figure 9:
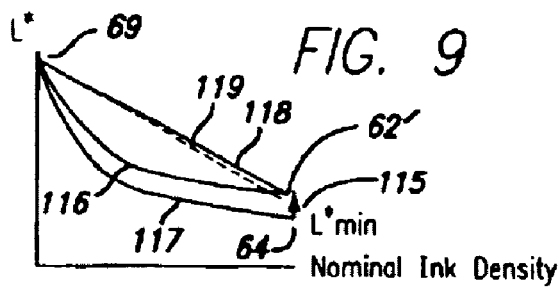
FIG. 9 is a graph like FIG. 3, but following a novel full-inking-point displacement, range resealing and linearization procedure according to the present invention, rather than conventional procedure (and accordingly showing standardization of color and near-absolute color correction)

At intermediate points between the right-hand and left-hand ends of the correction function 65, the angled line 67 indicates how this matching portion of the adjustment is distributed over the dynamic range—maintaining linearity while accommodating the desired luminosity step 115 (FIG. 9). The same distribution of the correction throughout the range appears in the additive version 65' (FIG. 6) of the correction, with its corresponding inclined straight line 67' departing from the horizontal zero value implied for earlier procedures.

Measurements of residual color error, particularly at the low-luminosity end of the dynamic range for the primary colorants, indicate that the absolute accuracy is improved from the previously mentioned 5 dL* to better than 1.5 dL*. It is believed that as a result an even more significant improvement is obtained in color consistency for colors produced by combining the primaries.

The low-luminosity $L^*_{MIN}$ points 62, 64 and 62' (FIGS. 3 through 6, and FIGS. 9 and 10), are in effect anchor values that participate in controlling the slope of the linearized response in each printer. The invention standardizes this $L^*_{MIN}$ point in all the machines throughout a product line.

At the other end of the dynamic range, the high-luminosity $L^*_{MAX}$ points 69 are relatively very well defined. Since the two endpoints of the range are now much more uniform, all other printed densities too, in these machines, tend to match those in the standard response.

If field measurements for a particular colorant in a particular printer yield a low-luminosity point 64 that is in fact lower than the nominal, this must mean that the printer is applying excessive amounts of that colorant, at least in that low-luminosity part of its operating range (i.e. maximum colorant saturation). What is necessary then is to decrease the amount of ink of that color, in just the right proportion to inhibit the actual tone density (amplify the actual luminosity) to the nominal value—and this is exactly what the printer automatically does in the field.

If instead field measurements yield a low-luminosity point 64' (FIG. 11) that is higher than the nominal, this must mean that the printer is applying inadequate amounts of that colorant, at least in that low-luminosity part of its operating range (i.e. maximum colorant saturation). What is necessary then is to increase the amount of ink of that color, in just the right proportion to augment the actual tone density (suppress the actual luminosity) to the nominal value—and the printer does this too, all automatically, in the field.

It has not yet been shown exactly how this inhibition or augmentation of tone density (or the corresponding amplification or suppression of luminosity) is accomplished. In all of the graphs discussed above, the abscissae represent exclusively the nominal ink density—that is to say, the density as expressed at a relatively high conceptual level, namely tonal values in an image-data file 43 (FIG. 7).

Figure 13:
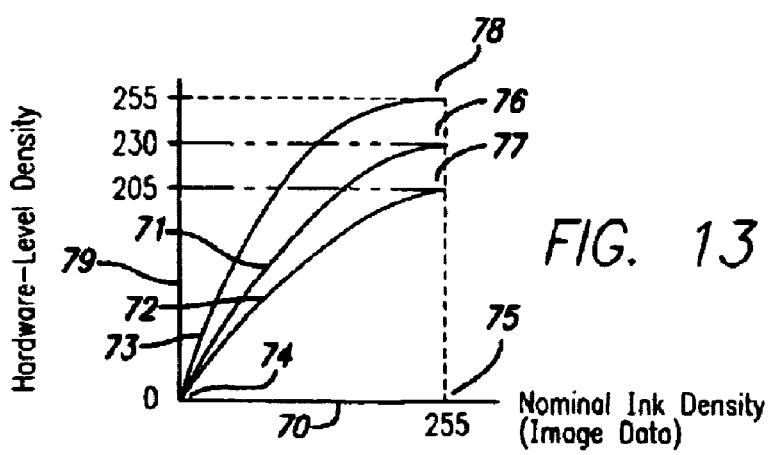
FIG. 13 is a graph showing at a lower conceptual level—namely, in machine-language or hardware-language terms—how the invention rescales received image data for printing by nominal-, overbold- and overlight-inking printing-element arrays respectively.

Considered instead at a lower level conceptually, in actual machine-language terms, conversion for a nominal-dropweight printhead is a remapping 71 (FIG. 13) of all the image data from nominal tones, again on the abscissa 70, to hardware tones now plotted along the ordinate 79. This remapping 71 appears as upward-convex due to the linearization requirement as before.

More significantly to the present explanation, the remapping also downsamples (i.e. interpolates) nearly all the tone or density numbers 0–255 to a shorter overall scale 0–230. That is, if the maximum density 75 handled in the system is hexadecimal 255, this maximum tone number is remapped 71 to a new density number 76, namely hexadecimal 230 as shown.

The scale and thereby the overall dynamic range, for a nominal head, is foreshortened by roughly ten percent. For a high-dropweight head, however, the conversion 65 (FIG. 10) is a more-stringent remapping 72 (FIG. 13)—with an overall reduction of density numbers from hexadecimal 255 to a lower new density number 77, namely e.g. hexadecimal 205 as shown (or e.g. 200). That is, for such a high-weight head the overall scale 0–255 shrinks to 0–205.

The purpose of this across-the-board downscaling is to accommodate a low-dropweight head, which as above-mentioned requires augmented density, also recognized as suppressed luminosity. For the weakest permissible printhead the mapping 73 from nominal density (again, image-data numbers) 70 to hardware-language density 79 is one-to-one at the maximum-density point 78: an input 75 of hexadecimal 255 maps to an output 78 that is unchanged—still hexadecimal 255—and only the intermediate values are shifted, as the upward-convex curve 73 shows, to accomplish linearization.

Relative to the nominal and high-dropweight heads, however, this unchanged or one-to-one maximum-density remapping 73 represents a scale expansion. Hence at the machine level, considered relative to the dynamic range of a nominal head, that of a weak head is expanded while that of an overstrong head is contracted.

The invention thus discards dynamic range for not only overweight inkdrops but also nominal-weight inkdrops. In rare cases some desired colors may fall out of gamut as a result.

Successful practice of the invention therefore calls for careful machine and printhead design to ensure that the gamut is wide enough for the intended market. This can be accomplished by careful engineering adjustments of ink chemistry, print media, dropweight ranges and all the other factors common in inkjet printing—and the corresponding parameters in the several other forms of incremental printing.

All such remapping is performed in the same stroke with the linearization 44 (FIG. 7). Hence the full power of the halftoning stage 46 is advantageously applied to spread out the impact all of the tonal adjustments alike.

By the same philosophy of the invention, preferred embodiments include neither conventional depletion nor the propletion principle of the Borrell document. Algorithms for both can be used in conjunction with the present invention; however, depletion removes posthalftoned dots on media based on criteria that encompass only gross inking-volume concerns and thus fail to take into account finer image-quality effects.

Depletion in fact commonly introduces artifacts such as graininess. Prehalftoning corrections according to the preferred embodiments of this invention are not only more elegant but also, again, invoke the mechanisms of the halftoning stage 46 to integrate all the image features into a properly textured whole.

Once beyond the laboratory printing-and-measurement stages, these remarkable accomplishments are achieved with a substantially unmodified six-dollar line sensor—not a spectrophotometer, not even a fifty-dollar colorimeter. With the same direct material cost as competing products of the same manufacturer, this invention provides color-correction precision that is twice as fine, and accuracy that is more than three times finer.

3. Hardware, Program and Storage Implementation

As the invention is amenable to implementation in, or as, any one of a very great number of different printer models of many different manufacturers, little purpose would be served by illustrating a representative such printer. If of interest, however, such a printer and some of its prominent operating subsystems can be seen illustrated and discussed in several other patent documents of the assignee, Hewlett Packard—such as for example the previously mentioned document of Thomas Baker, which particularly illustrates a large-format printer-plotter model suited for use as a multitask machine.

The most highly preferred embodiment of the invention operates in a printer that has three different printmode quality levels, respectively designated "normal", "best" and "superbest". For nearly all printing media of interest, the printmodes were developed carefully keeping in mind the maximum uniformity possible—in terms of all the elements that come into play in color correction—in such a way that a calibration performed for the best mode can be translated into normal and superbest without storage of different minimum L* or maximum b* values.

Engineering of printmodes, balancing the speed and number of passes to obtain a selected level of quality, is known in the art. If preferred, however, the modes can be designed much more routinely at the cost of merely storing a few more L* and b* numbers.

The number of media designed for use with the most highly preferred embodiment is six. For one of these media and one of the three printmodes (superbest), however, it was found preferable to use a different perceptual-parameter set than for that medium with the other two modes.

Based on this preference and otherwise using the maximum-uniformity approach noted above, the number of different mode-media combinations needing separate maximum-nominal tone storage is seven. For each of these seven combinations, six values are stored—for a total of forty-two values (FIG. 14).

The above disclosure is intended as merely exemplary, and not to limit the scope of the invention—which is to be determined by reference to the appended claims.

What is claimed is:

1. A method of color-calibrating an incremental printer; said method comprising the steps of, for each of plural colorants respectively:

defining at least one standard maximum tone;

establishing an absolute perceptual parameter of the at least one defined maximum tone;

in substantially each printer or printer driver of a product line, storing a numerical representation of the established absolute parameter for later use in color-correction calculations for the printer.

2. The method of claim 1, wherein:

the storing step is performed before distribution of the respective printer from a manufacturer of the printer.

3. The method of claim 2, wherein:

the storing step is performed again for a revised, second defined standard maximum tone after distribution.

4. The method of claim 1, wherein:

the defining, establishing and storing steps are performed for at least one nonchromatic colorant and at least one chromatic colorant in the printer.

5. The method of claim 1, wherein:

for at least one chromatic colorant the defining, establishing and storing steps are performed for plural combinations of printmode and printing medium used in the printer.

6. The method of claim 1, wherein:

the defining and establishing steps comprise measuring the absolute perceptual parameter for a representative printer in the product line.

7. The method of claim 1, wherein:

the defining and establishing steps comprise measuring the absolute perceptual parameter for each of representative printers in the product line, and selecting from among the measurements.

8. The method of claim 1, wherein:

the defining and establishing steps comprise measuring the absolute perceptual parameter for each of representative printers in the product line, and combining the measurements.

9. The method of claim 1, further comprising the step of:

in an end-user facility, automatically applying the stored numerical representation in calculations for color correction in the printer.

10. The method of claim 9, wherein, for each chromatic colorant respectively:

the applying step comprises contracting or expanding the printer dynamic range to force a maximum tone printed by the printer to match the defined standard tone.

11. The method of claim 10, wherein the defining and establishing steps comprise:
   determining the absolute perceptual parameter for printers that represent extremes of performance of the product line; and
   selecting the numerical representation and selecting printer operating conditions in view of the determined parameter for said extremes of performance, to ensure that in each printer of the product line the applying step will be able to force the maximum tone to reach the standard value.

12. The method of claim 10, wherein:
   the applying step further comprises linearizing later printing of the respective colorant, using the forced match as one endpoint of the linearizing.

13. The method of claim 10, wherein the contracting or expanding comprises:
   cutting off maximum tonal density early for marking arrays that are marking too boldly; and
   extending maximum tonal density to cut off late for marking arrays that are marking too lightly.

14. The method of claim 9:
   further comprising the steps of, in the end-user facility but before the applying step:
      using the printer to print a specimen of the maximum tone, and
      measuring the absolute perceptual parameter for the specimen;
   the applying step further comprises employing the measured parameter for the specimen, as an instance of the maximum tone printed in the absence of the contracting or expanding; and
   the contracting or expanding comprises forcing the measured absolute perceptual parameter for later-printed instances of the maximum tone to match the established absolute perceptual parameter for the defined standard tone.

15. The method of claim 9, wherein:
   the applying step comprises introducing the correction upstream of printmasking.

16. The method of claim 1, wherein:
   the defining, establishing and storing steps operate with respect to substantially exclusively a single tone for each colorant, as distinguished from recording an entire colorimetric calibration throughout a tonal range.

17. A method of color-calibrating an incremental printer in an end-user facility; said method comprising the steps of, for each of plural colorants in the printer:
   retrieving from the printer or a printer driver a stored numerical representation of an absolute perceptual parameter for a standard maximum tone; and
   applying the retrieved numerical representation in color-correction calculations for the printer.

18. The method of claim 17, wherein, for each chromatic colorant respectively:
   the applying step comprises contracting or expanding the printer dynamic range to force a maximum tone printed by the printer to match the defined standard tone.

19. The method of claim 18:
   further comprising the steps of, before the applying step:
      using the printer to print a specimen of the maximum tone, and
      measuring the absolute perceptual parameter for the specimen;
   the applying step further comprises employing the measured parameter for the specimen as an instance of the maximum tone printed in the absence of the contracting or expanding; and
   the contracting or expanding comprises forcing the measured absolute perceptual parameter for later-printed instances of the maximum tone to match the established absolute perceptual parameter for the defined standard tone.

20. The method of claim 18, wherein:
   the applying step further comprises linearizing later printing of the respective colorant, using the forced match as one endpoint of the linearizing.

21. The method of claim 18, wherein the contracting or expanding comprises:
   cutting off maximum tonal density early for marking arrays that are marking too boldly; and
   extending maximum tonal density to cut off late for marking arrays that are marking too lightly.

22. The method of claim 17, wherein:
   the applying step comprises introducing the correction upstream of printmasking.

23. The method of claim 17, further comprising the step of, before the retrieving step:
   downloading from a network an updated value of the numerical representation.

24. The method of claim 17, wherein:
   the applying step is performed in the printer by integrated circuits operating programs.

25. The method of claim 24, wherein:
   the applying step sets the minimum luminosity that the printer can image, to match the stored numerical representation.

26. The method of claim 17, still for each colorant:
   further comprising the step of printing a tonal ramp; and
   wherein the measuring step comprises using a calibrated line sensor to measure the printed tonal ramp.

27. The method of claim 26, wherein said line-sensor using comprises:
   assembling a set of sensor readings for each tone in the ramp;
   normalizing the readings with respect to the tonal range between reflection from unprinted printing medium and the maximum tone; and
   based upon nonlinearity in the normalized, adjusted and referred readings, determining a correction function to establish linearity in the readings.

28. A method of providing substantially absolute color standardization in substantially all incremental printers of a product line; said method comprising the steps of, for at least one chromatic colorant:
   storing, for access by each printer, a numerical representation of an absolute perceptual parameter for at least one tone; and
   later retrieving and Applying the stored representation to establish the printer dynamic range.

29. The method of claim 28, wherein:
   the tone is a maximum printable tone.

30. The method of claim 29, wherein the storing step comprises placing the numerical representation in at least one article selected from among:
   each printer;
   a software cache accessible to each printer;
   a raster-image processor to be associated with each printer; and
   a software cache accessible to a raster-image processor to be associated with each printer.

31. The method of claim 30, wherein the placing comprises memorizing the numerical representation in a device selected from among:
   a read-only memory; and
   an application-specific integrated circuit.

32. The method of claim 29, wherein:
   the storing step comprises placing the numerical representation in a printer driver used by each printer.

33. The method of claim 29, wherein the applying step comprises closed-loop control based upon:
   printing a test pattern that nominally includes the maximum tone; and
   measuring the test pattern with a calibrated sensor to derive a comparable absolute perceptual parameter for the nominally included maximum tone.

34. The method of claim 33, wherein the closed-loop control comprises:
   comparing the stored numerical representation of the perceptual parameter with the comparable measured perceptual parameter; and
   from differences found in the comparison, deriving a correction function to be applied to image data in future printing.

35. The method of claim 34, wherein:
   the function comprises a correction, based on the retrieved at least one tone, that causes the printer perceptual output tones to be a linear function of input data level.

36. The method of claim 34, wherein:
   the storing step comprises storing numerical representations for plural tones;
   the retrieving step comprises retrieving the representations of the plural tones; and
   the function comprises a correction, based on the representations of the plural tones, that causes the printer perceptual output tones to be a nonlinear function of input data level.

37. The method of claim 34, wherein the closed-loop control comprises:
   in future printing, applying the correction function to image data.

38. The method of claim 29:
   wherein the storing step comprises storing a numerical representation of a standard value of the absolute perceptual parameter; and
   further comprising the steps of:
      determining the absolute perceptual parameter for printers that represent worst-case performance within the product line, and
      selecting the numerical representation and selecting printer operating conditions in view of the determined parameter for said worst-case performance, to ensure that in each printer of the product line the applying step will be able to force the dynamic range to encompass the standard value.

* * * * *

UNITED STATES PATENT AND TRADEMARK OFFICE
CERTIFICATE OF CORRECTION

| | | |
|---|---|---|
| PATENT NO. | : 7,134,737 B2 | |
| APPLICATION NO. | : 09/945492 | |
| DATED | : November 14, 2006 | |
| INVENTOR(S) | : Ferran Vilanova et al. | |

It is certified that error appears in the above-identified patent and that said Letters Patent is hereby corrected as shown below:

In column 4, line 19, delete "or" and insert -- of --, therefor.

In column 12, line 14, delete "resealing" and insert -- rescaling --, therefor.

In column 15, line 56, delete "calorimeter" and insert -- colorimeter --, therefor.

In column 22, line 55, in Claim 28, delete "Applying" and insert -- applying --, therefor.

Signed and Sealed this

Ninth Day of December, 2008

JON W. DUDAS
*Director of the United States Patent and Trademark Office*